United States Patent
Lee et al.

(10) Patent No.: US 7,974,036 B2
(45) Date of Patent: Jul. 5, 2011

(54) TIME-SHIFTED BITS FOR WRITE SYNCHRONIZATION CORRECTION

(75) Inventors: Shih-Fu Lee, Fremont, CA (US);
Alexander Y. Dobin, Milpitas, CA (US);
Dave M. Tung, Livermore, CA (US);
David S. Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 205 days.

(21) Appl. No.: 12/194,264

(22) Filed: Aug. 19, 2008

(65) Prior Publication Data

US 2010/0046118 A1 Feb. 25, 2010

(51) Int. Cl.
*G11B 5/09* (2006.01)
(52) U.S. Cl. ............... 360/51; 360/75; 360/135
(58) Field of Classification Search .......... None
See application file for complete search history.

(56) References Cited

U.S. PATENT DOCUMENTS

| | | | |
|---|---|---|---|
| 4,607,295 A | 8/1986 | Uno | |
| 4,636,885 A | 1/1987 | Yamada et al. | |
| 4,669,003 A | 5/1987 | Bell et al. | |
| 5,258,876 A | 11/1993 | Danner et al. | |
| 5,956,200 A | 9/1999 | Kohno et al. | |
| 6,002,731 A | 12/1999 | Aoki et al. | |
| 6,373,911 B1 | 4/2002 | Tajima et al. | |
| 6,563,886 B1 | 5/2003 | Kubo et al. | |
| 6,620,532 B2 * | 9/2003 | Aoyama | 428/835.5 |
| 6,738,207 B1 * | 5/2004 | Belser et al. | 360/31 |
| 7,123,567 B2 | 10/2006 | Senshu | |
| 7,153,597 B2 * | 12/2006 | Yang et al. | 428/836 |
| 2007/0133120 A1 | 6/2007 | Ishii | |

* cited by examiner

*Primary Examiner* — Jason C Olson
(74) *Attorney, Agent, or Firm* — Arent Fox LLP

(57) ABSTRACT

Systems and methods are provided for correcting write synchronization of a magnetic storage device with respect to magnetic storage media and its corresponding writable magnetic bits, or dots. In particular, these systems and methods involve using time-shifting principles to calibrate the magnetic storage devices to correct slow drifts of reader-writer timing. It is to be appreciated that time-shifting techniques can be applied in a variety of manners. For example, the very dots on the media can be positioned in time-shifted fashion. In another example, the writing to the dots can be time-shifted.

6 Claims, 6 Drawing Sheets

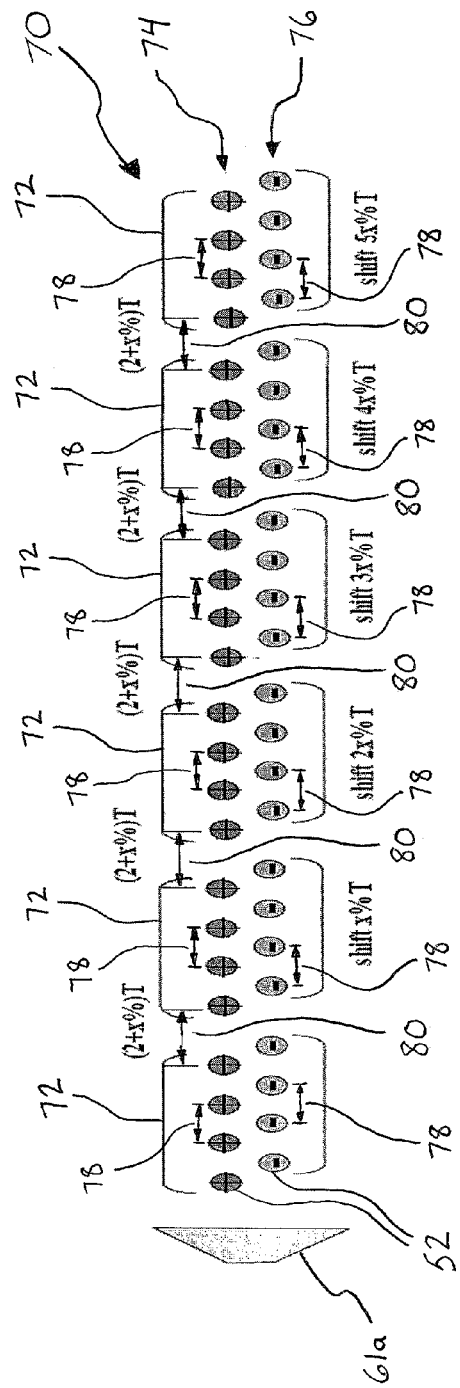
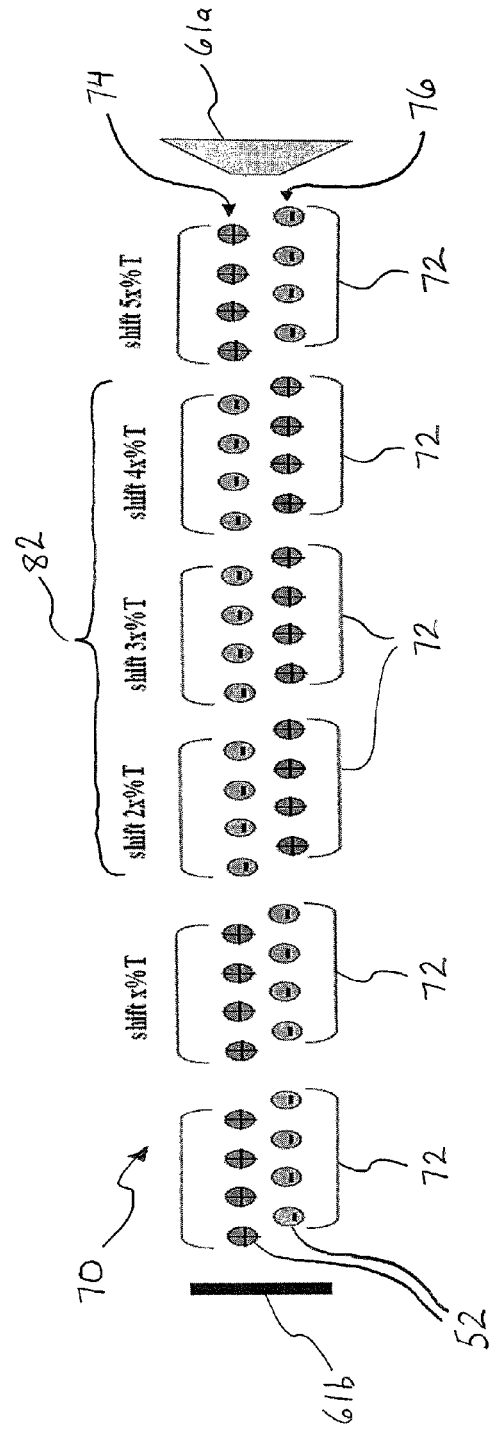
Figure 4
Figure 5

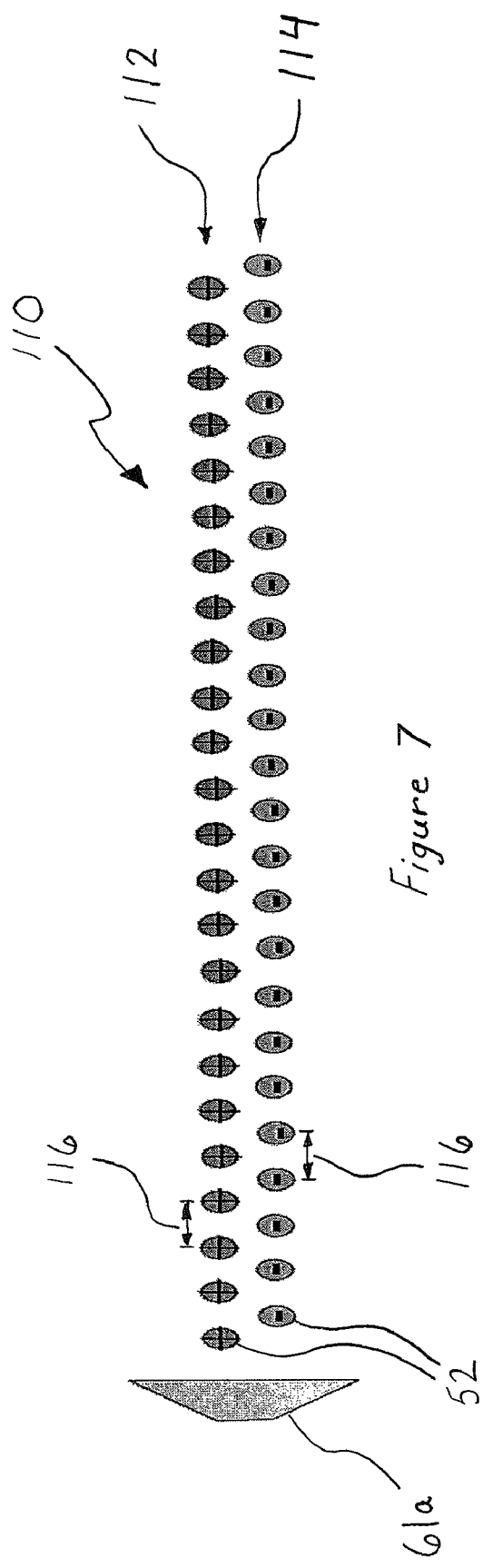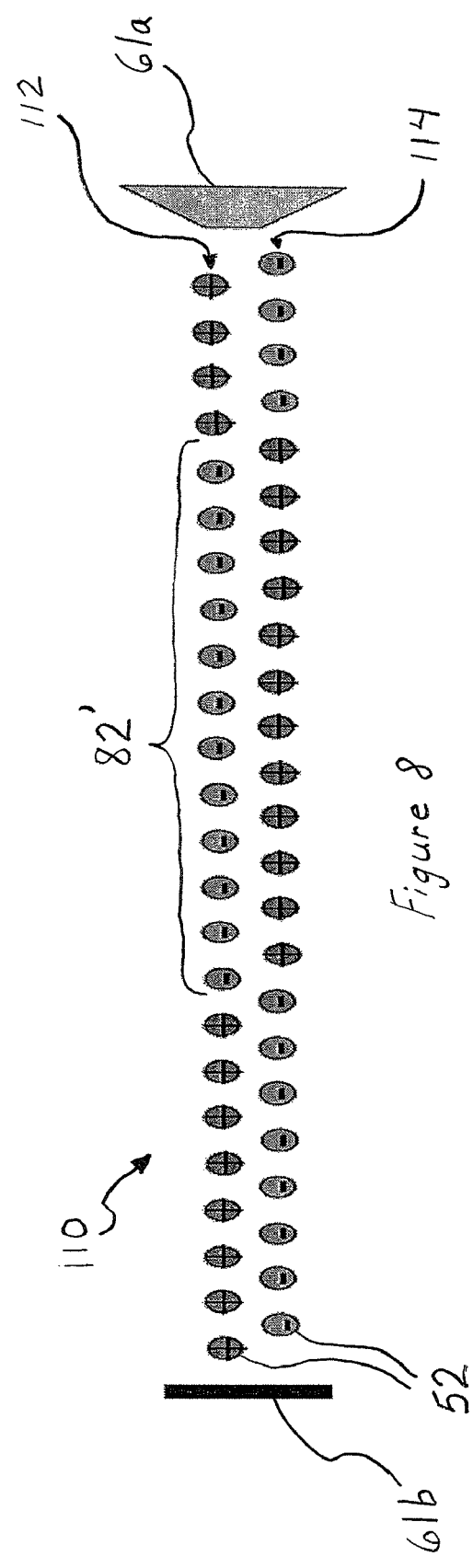

TIME-SHIFTED BITS FOR WRITE SYNCHRONIZATION CORRECTION

BACKGROUND

Magnetic storage devices are used to store data on a magnetic storage medium through the use of a transducer that writes and reads magnetic data on the medium. For example, a disc storage device is generally adapted to work with one or more magnetic recording discs that are coaxially mounted on a spindle motor of the device for high-speed rotation. As the discs rotate, corresponding transducers, i.e., read/write heads, are moved across the surfaces of the discs by an actuator assembly to read and write digital information on the discs.

Given the general desire to store ever-increasing amounts of digital information, designers and manufacturers of magnetic storage devices are continually attempting to increase the bit density of magnetic storage media. In a magnetic recording disc, this means increasing the areal density, i.e., the number of tracks on a disc and/or the linear density of bits along a given track. One manner in which areal densities have been increased has involved the use of bit-patterned media (BPM).

In BPM, the magnetic recording surface is patterned to provide a number of discrete, single-domain magnetic islands (usually one island per bit) separated from each other. During recording and readback of data to and from the bits, the separation of the bits greatly limits exchange coupling there between. As a result, bits can be positioned close together when using BPM while preventing interference between the bits. Servo information is often included on the BPM in order to provide positioning information for a servo control system. To this end, during a writing operation on a BPM, a write or recording head can be precisely positioned over a given data array, e.g., data track, to magnetize the bits thereon, where such bits are often referred to as dots. Thus, for example, during the rotation of a magnetic recording disc, the head can be carefully aligned over the dots it passes in order to facilitate data recording and data readback processes.

However, even with such general alignment between the head and disc dots, BPM has presented further challenges to disc-drive operation. One of these challenges has involved synchronizing the write timing of a disc storage device with the discs and their existing dots. Based on preliminary modeling results, the window for successful writes to a disc can generally be found to be within 30% of the length of the bits. Given a general density of 1 terabit per square inch, such 30% length translates to about 4 nm. Depending on the RPM and radii of the drive operations, this could further translate to writing periods on the order of 10 ps. Consequently, the general writing operation permits limited opportunity for feedback to the disc storage device. Further, it is commonly agreed that the write head (or writer) is not able to provide position feedback by itself. In other words, the writer does not function as a sensor so as to register its position relative to the 'writable' dots on the disc. Thus, there are challenges in locating a sensing apparatus to facilitate correction of the write timing synchronization and in providing timely feedback of position information to the disc storage system. Embodiments of the present invention are focused on addressing these challenges.

SUMMARY

Certain embodiments of the invention provide systems and methods concerned with correcting write synchronization of a magnetic storage device with respect to magnetic storage media and its corresponding writable magnetic bits, or dots. In particular, these systems and methods relate to calibrating the magnetic storage devices to correct slow drifts of write-timing. In certain embodiments, the magnetic storage media can be a magnetic storage disc, whereby the synchronization involves using time-shifting principles with respect to the dots on the disc.

It is to be appreciated that time-shifting techniques can be applied in a variety of manners. For example, in some embodiments, the very dots on the media can be positioned in time-shifted fashion. Such embodiments, when involving magnetic storage discs, can involve fabricating the dots so that they are provided in a plurality of groupings or clusters in the data arrays of the disc. As such, when writing to the dot groupings in a data array, only certain of the dot groupings are written to. In turn, when subsequently reading the dot groupings, a control system of the magnetic storage device can be used to differentiate which groupings have been written to and which have not. Further, in correcting the write synchronization of the magnetic storage device, the control system can use the dot-groupings collectively as a counter, facilitating a manner in which the writing process can be shifted forward or back with respect to the dot groupings of the data array for future recordings to the array.

In some other embodiments, for example, the writing to the dots can be time-shifted. Such embodiments can involve fabricating the dots so that they are uniformly spaced in each of the data arrays of the disc. As such, when shifting the write timing over a number of write iterations with respect to the dots in a data array, each write iteration results in a distinct writing with respect to the dots of the array. In reading the written-to dots following each write iteration, a control system of the magnetic storage device can be used to determine which write-timing resulted in the smallest write positioning error with respect to the dots. Following such determination, the control system can use the time shift corresponding to the smallest write error in shifting the writing process forward or back with respect to the dots of the data array for future recordings to the array.

These and various other features and advantages will be apparent from a reading of the following detailed description.

BRIEF DESCRIPTION OF THE DRAWINGS

FIG. 4 is a top plan view of a data array on a portion of a magnetic storage medium used in an exemplary method of correcting write-time synchronization in accordance with certain embodiments of the invention.

FIG. 5 is a top plan view of the data array of FIG. 4 following a write process in accordance with certain embodiments of the invention.

FIG. 7 is a top plan view of a data array on a portion of a magnetic storage medium used in a further exemplary method of correcting write synchronization in accordance with certain embodiments of the invention.

FIG. 8 is a top plan view of the data array of FIG. 7 following a write process in accordance with certain embodiments of the invention.

DETAILED DESCRIPTION OF THE PREFERRED EMBODIMENTS

Figure 1:
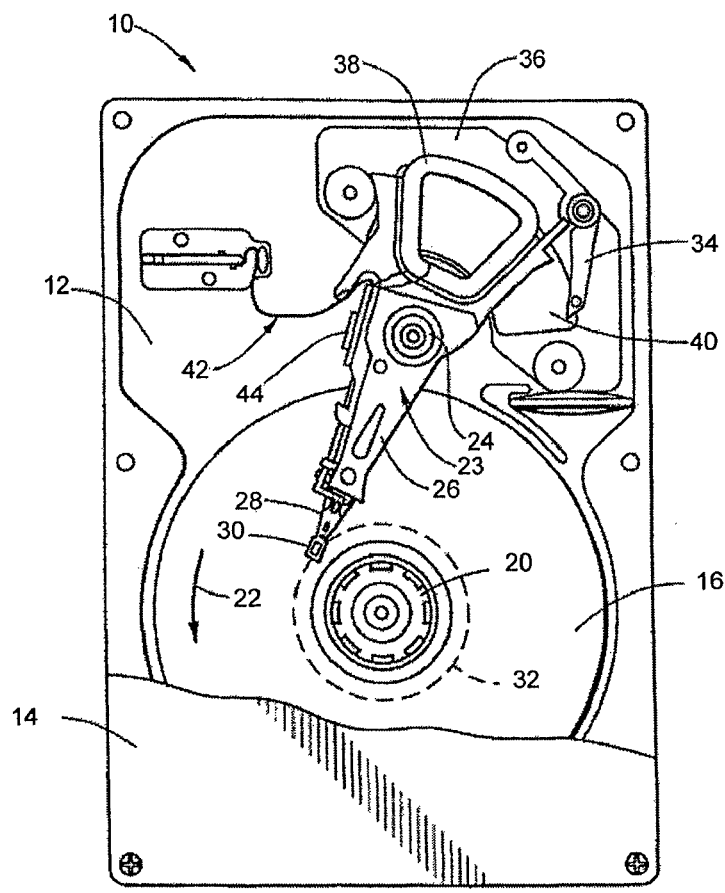
FIG. 1 is a top plan view of a magnetic storage device in accordance with certain embodiments of the present invention.

The following detailed description should be read with reference to the drawings, in which like elements in different drawings are numbered identically. Embodiments shown in the drawings are not necessarily to scale, unless otherwise noted. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims. For example, while embodiments described herein involve magnetic storage devices and patterned magnetic media, the embodiments could just as well be applied to any recording storage device and/or any patterned recording medium.

FIG. 1 is a top plan view of a magnetic storage device 10 in accordance with certain embodiments of the invention. In the embodiment shown, the device 10 takes the form of a disc drive of the type used to interface with a host computer to magnetically store and retrieve user data. The disc drive includes various components mounted to a base 12. A top cover 14 (shown in partial cutaway fashion) cooperates with the base 12 to form an internal, sealed environment for the disc drive.

The magnetic storage device 10 includes magnetic storage media for recording data. In the embodiment shown in FIG. 1, the media takes the form of a plurality of axially-aligned, magnetic recording discs 16 mounted to a spindle motor (shown generally at 20) for rotating at a speed in a rotational direction 22. An actuator 23, which rotates about a bearing shaft assembly 24 positioned adjacent the discs 16, is used to write and read data to and from tracks (not designated) on the discs 16.

The actuator 23 includes a plurality of rigid actuator arms 26. Flexible suspension assemblies 28 are attached to the distal end of the actuator arms 26 to support a corresponding array of transducers 30 (e.g., read and write heads), with one transducer adjacent each disc surface. Each transducer 30 includes a slider assembly (not separately designated) designed to fly in close proximity to the corresponding surface of the associated disc 16. Upon deactivation of the disc drive 10, the transducers 30 come to rest on an outer stop 32 and a magnetic latch 34 secures the actuator 23.

A voice coil motor (VCM) 36 is used to move the actuator 23 and includes an actuator coil 38 and permanent magnet 40. Application of current to the coil 38 induces rotation of the actuator 23 about the pivot assembly 24. A flex circuit assembly 42 provides electrical communication paths between the actuator 23 and a disc drive printed circuit board assembly (PCBA) mounted to the underside of the base 12. The flex circuit assembly 42 includes a preamplifier/driver circuit 44 which applies currents to the transducers 30 to read and write data.

Figure 2:
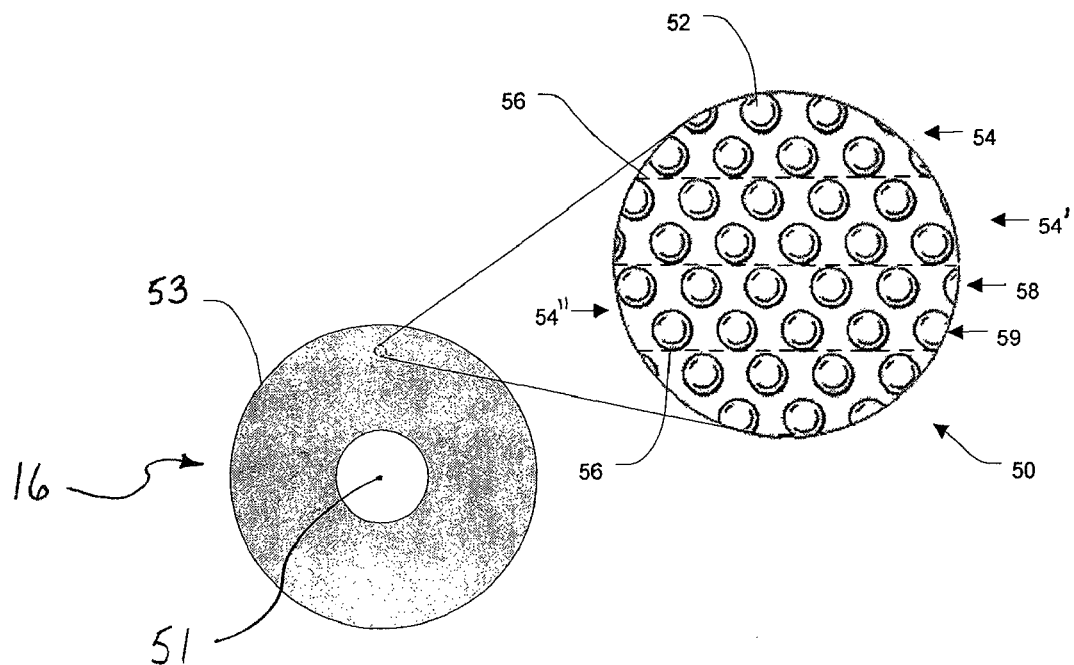
FIG. 2 is a top plan view of a data bit pattern of a magnetic storage medium in accordance with certain embodiments of the present invention.

FIG. 2 is a top plan view of one magnetic storage disc 16, with an enlarged area illustrating a data bit pattern 50 in accordance with certain embodiments of the invention. The magnetic storage disc 16 is shown as a bit patterned medium (BPM), wherein the data bit pattern includes a plurality of separate and discrete recording bits or dots 52 organized in a staggered bit pattern. The BPM generally includes a non-magnetic substrate with an overlying magnetic recording layer with perpendicular anisotropy, along with one or more interlayers between the substrate and the magnetic layer according to some embodiments. The magnetic layer is patterned to form the discrete and separate dots 52 through, for example, lithographic patterning or self-organizing nanoparticle arrays. In some embodiments, the magnetic storage disc 16 is DC erased before it is mounted within the magnetic storage device.

The dots 52 extend around the disc 16 and are divided into a plurality of data arrays. In certain embodiments, as shown, the data arrays can take the form of concentrically spaced data tracks, e.g., data tracks 54, 54' and 54", each being defined by bordering dashed lines 56 and generally perpendicular to the radius of the disc. Although the data arrays comprise concentric data tracks in the magnetic storage medium in this embodiment, it should be appreciated that the data arrays may have alternate configurations and geometries when provided in other data storage mediums.

With further reference to FIG. 2, each data array in the embodiment comprises a plurality of staggered dots 52 extending around the disc. The data arrays, as exemplarily shown, comprise a staggered, two-bit wide dot pattern, with each data array having at least a first grouping 58 of dots 52 and a second grouping 59 of dots 52, however, the invention should not be limited to such. In certain embodiments, the first grouping 58 involves a row of outer diameter dots 52 and the second grouping 59 involves a row of inner diameter dots 52. Although the data arrays in FIG. 2 are depicted as being two bits wide, it is contemplated that the arrays may also be wider than two bits according to some embodiments.

The data arrays of FIG. 2 are further organized into one or more data sectors having a plurality of recording bits magnetized by the transducer 30 to record data. The term "recording bit" is used herein to represent the dots 52 in which the transducer, e.g., read/write head(s), can repeatedly record and/or overwrite data, such as, for example, the data routed to a storage device from a computer operating system (sometimes referred to herein as "user data"). In contrast, position information may initially be recorded in a "servo" sector or servo bits (not shown), but is usually not repeatedly recorded and/or overwritten in servo bits in the same way as data is recorded in the recording bits. A servo sector may include sector and track identification codes as well as servo burst patterns used to maintain the head's position over the center of the data track.

Magnetic storage devices generally include a control system for accurately and reliably recording and reading data. For example, a disc storage device, such as the device 10 exemplified in FIG. 1, usually includes a closed-loop servo control system (not visibly shown) to control the movement of the transducers 30 across the surfaces of their associated magnetic recording discs 16. For example, with reference to FIGS. 1 and 2, to facilitate reliable writing data to and reading data from a specified data array (e.g., data track 54) on one of the magnetic recording discs 16, an associated transducer 30 is generally positioned over the center of the data array as the array moves beneath the transducer 30. To position the transducer 30 during one operation, the servo control system first typically performs a seek function in which the transducer 30 is moved from its current position to the specified data array. Upon reaching the destination data array, the servo control system then performs a tracking function in which the position of the transducer 30 is monitored and adjusted to ensure that it is following the data array.

Continuing with the above example, the servo control system generally receives a servo information signal from the transducer 30 indicating the transducer's position as it passes over one or more servo sectors on the corresponding disc 16. The servo control system then processes the servo information signal to determine the current position of the transducer 30 and the movements to adjust the position of the transducer 30, if necessary. Disc storage devices, such as the device 10 exemplified in FIG. 1, generally employ either dedicated servo systems, in which a separate disc is dedicated to storing servo information, or an embedded servo system in which servo sectors are positioned between data sectors on a single disc. A servo sector may include sector and array identification codes as well as servo burst patterns used to maintain the transducer's position over the center of the data array.

Figure 3:
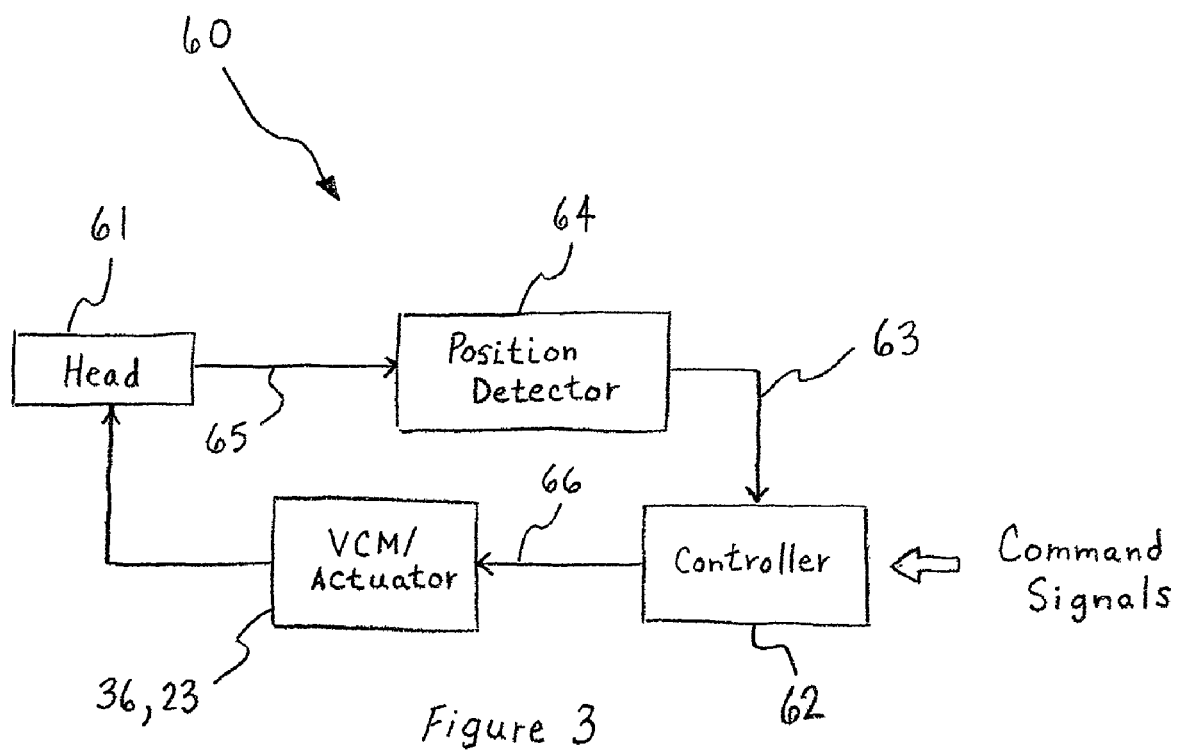
FIG. 3 is a block diagram of servo control system in accordance with certain embodiments of the present invention.

FIG. 3 shows a functional block diagram of a servo control system 60 in accordance with certain embodiments of the invention. As described above with reference to FIG. 2, the system 60 can operate with the disc storage device 10 to provide positional control for the one or more transducers 30, each having one or more heads 61 with read/write capability. While read and write heads are separately referenced herein, such is merely done for clarity purposes. As such, embodiments of the invention should not be limited to such. Instead, it should be appreciated that such heads can involve a singular body having both read and write ability or separate bodies offset from each other with one of the bodies having read functionality and the other body having write functionality.

With continued reference to FIG. 3, the servo control system 60 generally includes a controller 62 (e.g., a digital signal processor), which receives command signals from a host system (e.g., personal computer) and one or more position signals 63 from a servo position detector 64, according to certain embodiments of the invention. The position detector 64, in certain embodiments, receives a readback signal 65 from the head 61 from which it extracts, or generates, the one or more position signals 63. In turn, the controller 62 processes the one or more position signals 63 and any command signals from the host system and sends a corresponding control signal 66 to the VCM 36 to move the actuator 23 and the transducer 30, or head 61.

As described above, embodiments of the invention are directed to correcting write synchronization of a magnetic storage device with respect to a magnetic storage medium and its existing dots thereon. For example, with reference to FIGS. 1 and 2, in certain embodiments the magnetic storage device can involve the disc recording device 10 with the corresponding discs 16 and their existing dots 52 thereon. Regarding any of the discs 16, while the actuator 23 and corresponding transducer 30 (read/write heads 61) can be precisely positioned with the disc's data arrays using the servo control system 60 as described above, synchronizing the write-timing of the heads 61 with respect to the dots 52 of the data arrays is a further consideration.

As described above, because the write head (or writer) of each transducer 30 is not able to provide position feedback by itself, one thought would be to use the read head (or reader) as a detector for write-timing adjustment. However, one challenge in doing so involves determining how the storage device system can process the time latency between readback signals and a write-timing gate associated with the write head, particularly since the write head does not feedback any timing information. In addition, the time latency in the circuitries from readback signals to a write gate controller can vary from time to time. Depending on the sources of these variations, different frequencies of calibration to adjust the write-time synchronization may be required. Because the write head is not a sensor, it would generally be unclear how the drive would process the variations between read and write timings and make adjustments accordingly. Embodiments of the invention are directed to overcoming these limitations in applying time-shifting principles to write synchronization correction.

It should be appreciated that systems and methods embodied herein can be used as a write-time calibration process to correct errors due to changes in read-to-write timing relations. In turn, if the timing relation is found to drift, the magnetic storage device can use one of the embodied systems/methods for re-calibration.

Referring back to FIG. 1, as described above, the flex circuit assembly 42 provides an electrical interface between the actuator 23 and the PCBA (mounted to the underside of the disc drive base 12), and further includes the preamplifier/driver circuit 44 which applies currents to the transducers 30 to read and write data. In certain embodiments, the PCBA and preamplifier/driver circuit 44 work in conjunction to facilitate the time shifting techniques, as described herein. Such time shifting techniques can be performed when the magnetic storage device is dormant, i.e., not in otherwise active operation with the corresponding disc.

Figure 6:
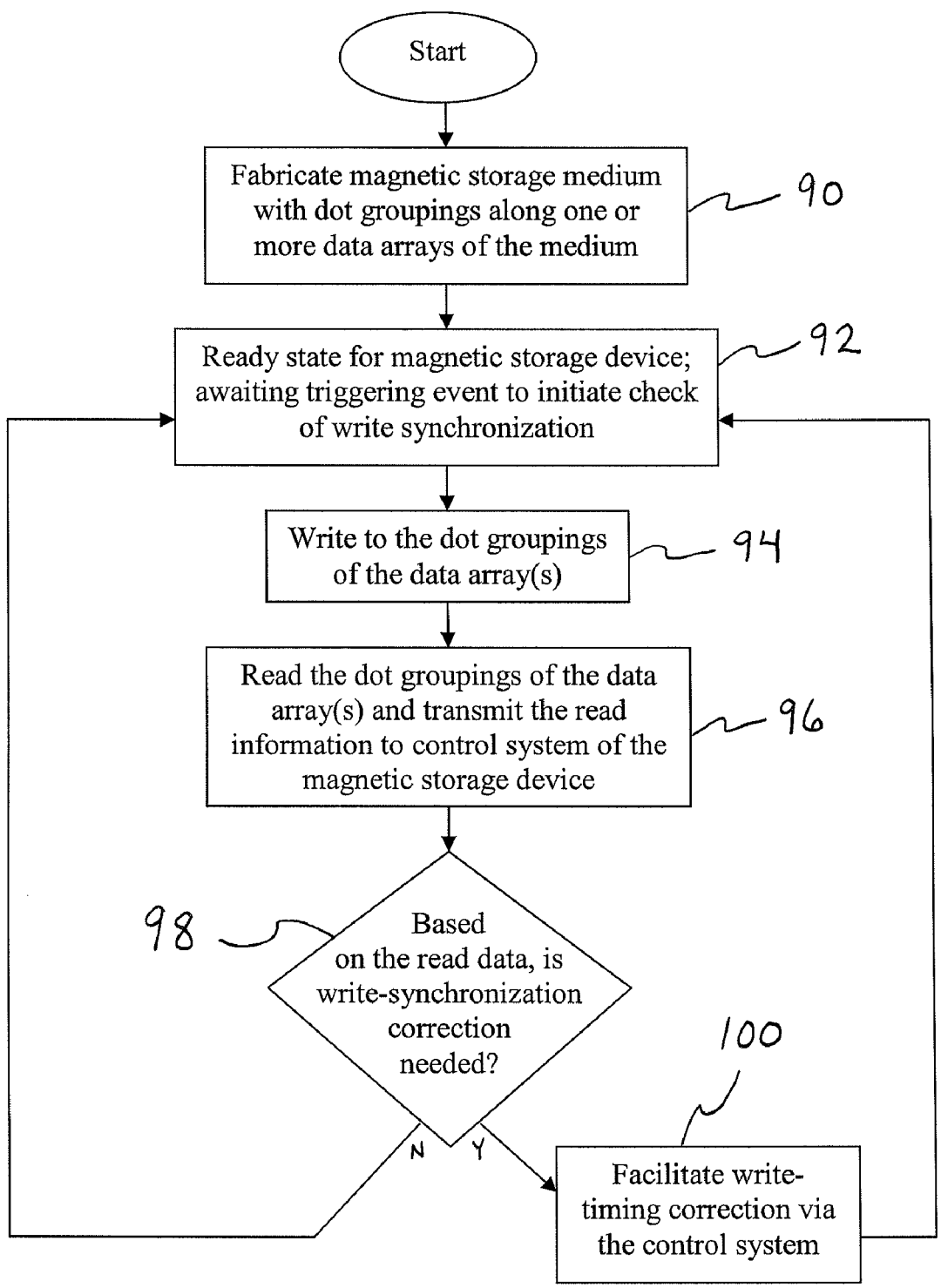
FIG. 6 is a flowchart depicting steps of the exemplary method of correcting write synchronization corresponding to the magnetic storage medium of FIG. 4 in accordance with certain embodiments of the invention.

It is to be appreciated that time-shifting techniques can be applied in a variety of manners in correcting write synchronization for magnetic storage devices. For example, in certain embodiments, such correction can involve time-shifting with respect to the dots on the magnetic storage medium. To help illustrate this type of time-shifting, FIGS. 4 and 5 each show top plan views of a data array on a portion of a magnetic storage medium in accordance with certain embodiments of the invention. While FIG. 4 illustrates the data array prior to a write process, FIG. 5 illustrates the array following the write process. FIG. 6 corresponds with FIGS. 4 and 5, and is a flowchart for the time-shifting method in accordance with certain embodiments of the invention.

Referring to FIG. 4, as illustrated, the dots 52 of the data array 70 are provided in a plurality of groupings 72, where each grouping 72 includes a plurality of dots 52. In certain embodiments, as shown, each grouping 72 can exemplarily involve eight dots 52; however, the invention should not be limited to such. The dots 52 of each grouping 72, in certain embodiments, can be provided in one or more rows. For example, as shown, the dots 52 of each grouping 72 can be provided in two rows, a top row 74 and a bottom row 76. As illustrated, the neighboring dots 52 (in each row 74, 76) of each grouping 72 are spaced a first distance 78 apart, while neighboring dot groupings 72 along the data array 70 are spaced a second distance 80 apart. In certain embodiments, the second distance 80 can be a deviation, e.g., (2+x %)1T, of the first distance 78, e.g., 1T. Accordingly, what results is a series of dot groupings 72 uniformly provided along the data array 70, with a first spacing being used between neighboring dots 52 of each of the groupings 72 and a second spacing being used between neighboring dot groupings 72. In certain embodiments, as shown in FIG. 4, the second spacing or distance 80 is greater than the first spacing or distance 78.

Each dot 52 of the data array 70 is magnetized, either positively (shown with a "+" designation) or negatively (shown with a "−" designation). In certain embodiments, as shown in FIG. 4, the top row 74 of each dot grouping 72 of the data array 70 may be positively magnetized, while the bottom row 76 of each dot grouping 72 of the array 70 may be negatively magnetized. It should be appreciated that the magnetization pattern of the dot groupings 72 can take any of a wide variety of forms, and the embodiments of the invention should not be limited to any such form. As is known, when being written to, a bit reverses its polarization or magnetization. There are various techniques in which magnetic storage media may be recorded to, for example, either vertically or longitudinally, both techniques being well known in the art. Regardless of recording technique, the embodiments provided herein are applicable.

With continued reference to FIG. 4, when writing to the dot groupings 72, a write head 61a will only write to a certain percentage of the dots 52, or within a certain write-timing window of the data array 70. As a result, in certain embodiments, only certain dot groupings 72 will be written to. For example, while embodiments of the invention should not be limited to such, if the initial recording pattern involves alternating magnetizations of a contiguous extent of dots 52, the magnetizations of the written-to dots will be reflected as one segment of the data array 70, with the dots 52 in the segment having their magnetizations reversed. FIG. 5 depicts the data array 70 of FIG. 4 after such a write process in accordance with certain embodiments of the invention. As described above, the operation system knows the initial pattern (or known sequence of codes) to write to the dots, and writes within a certain write-timing window 82. Consequently, as depicted in FIG. 5, those dot groupings 72 within the window 82 have their magnetization reversed, i.e., magnetization directions flipped.

With further reference to FIG. 5, it is exemplarily shown that the writing operation (within the window 82) results in a reversal of magnetization with respect to the dot groupings 72 that are shifted 2x %, 3x %, and 4x % from the initial dot grouping 72. Following the write process, the read head 61b reads the dot groupings 72 of the data array 70 and transmits such read information to a control system of the magnetic storage system. In certain embodiments involving the disc drive 10 and corresponding disc 16 of FIGS. 1-3, such information is transmitted via the flex circuit assembly 42 to a controller (e.g., a microprocessor) of the PCBA. The controller, in such embodiments, compares the magnetization pattern of the dot groupings 72 following the write process to an expected magnetization pattern. Accordingly, via a write-timing gate (not shown) of the preamplifier/driver circuit 44, the controller can, in turn, direct the write current so as to provide a corresponding synchronization correction to the write-timing. In certain embodiments, such correction is based in reference to the time-shifted dot groupings 72 of the data array 70. For example, in reference to FIG. 5, a correction of −2x % for the write current may be provided to bring the writing process in phase with the first dot grouping 72 of the data array 70 for subsequent recordings to the array 70.

As described above, FIG. 6 is a flowchart for the time-shifting method exemplarily illustrated with FIGS. 4 and 5 in accordance with certain embodiments of the invention. Step 90 involves fabricating a magnetic storage medium with dot groupings 72, whereby the groupings 72 are created along one or more data arrays 70. For example, in certain embodiments with reference to FIG. 2, when the medium is a magnetic recording disc 16, the dot groupings 72 are provided along one or more of the concentric data tracks, e.g., 54, 54', etc., on the disc 16. As described above with reference to FIG. 4, the dots 52 of each dot grouping 72 as well as the dot groupings 72 are spaced differently. While FIG. 4 exemplarily depicts one data array 70 and the dot groupings 72 thereon, in certain embodiments, any of the other data arrays on the medium can be similarly constructed as well.

Step 92 involves a ready state for the magnetic storage device. As such, the magnetic storage medium of step 90 is loaded into the device, after which the write synchronization of the device can be corrected with respect to the medium and its dots as desired. It should be appreciated that a correction to the write synchronization of the device would likely not be necessary following every write function to the data array 70. Accordingly, in certain embodiments, a triggering event can be used to initiate a check of the write synchronization of the magnetic storage device by its control system. As such, the frequency of checks with respect to the write synchronization of the device can be controlled as desired. For example, such triggering event may involve reaching a certain number of writings to the data array 70. In certain embodiments, with reference to the disc drive 10 of FIG. 1, such writing quantities can be tracked by the PCBA controller, and once the certain number of writing operations is reached, the control system is prompted to check the write synchronization, with the flowchart proceeding to step 94.

Step 94 involves writing to the dot groupings 52 of the data array 70. Such step initially involves positioning the write head 61a over the data array 70. In certain embodiments, as described above with reference to FIGS. 1 and 3, a corresponding actuator arm 26 is positioned by the VCM 36 via signals from the control system 60. The control system 60 takes its cues from signals read by the read head 61b from servo sectors on the data array 70. In turn, the transducer 30 of the actuator arm 26 can be precisely positioned over the data array 70 to facilitate writing to the dot groupings 72 thereof. Once so positioned, the write head 61a is ready to begin writing to the dot groupings 72. As described above, in certain embodiments, the write head 61a takes its cues from a controller of the PCBA of the disc drive 10. The PCBA works in conjunction with the flex circuit assembly 42 so as to control the timing of the write currents from the preamplifier/driver circuit 44. Accordingly, in certain embodiments, the controller of the PCBA transmits signals to the write head 61a to facilitate an initial write pattern (a known sequence of codes) to the dot groupings 72 of the data array 70. As described above, only those dot groupings 72 falling within the write-timing window 82 are recorded to, resulting in their magnetizations being reversed.

Step 96 involves reading the dot groupings 72 of the data array 70 and transmitting the read information to the magnetic storage operation system. In certain embodiments, such information is read by the read head 61b and transmitted from the head 61b to a control system of the disc drive 10. As described above, in certain embodiments, such transmission is facilitated by the flex circuit assembly 42 and involves routing the read data signals to the PCBA controller of the disc drive 10.

Step 98 involves determining whether write-synchronization correction is needed based on the read data. In certain embodiments, the PCBA controller compares the read magnetization pattern of the dot groupings 72 following the write process to an expected magnetization pattern of the dot groupings 72. Such expected magnetization pattern, in certain embodiments, can be stored in memory of the PCBA controller. If the read magnetization pattern differs from the expected magnetization pattern, the write timing or synchronization requires correction. Accordingly, the flowchart continues to step 100, whereby write-timing correction occurs. In certain embodiments, as described above with reference to FIG. 5, such correction is based in reference to the time-shifted dot groupings 72 of the data array 70 and facilitated via the PCBA controller. After such correction, the flowchart loops back to step 92. Conversely, if the write timing does not require correction (for example, wherein the write-timing is found to initiate at the first dot grouping 72 of the data array 70), the flowchart loops back to step 92 from step 98.

Figure 9:
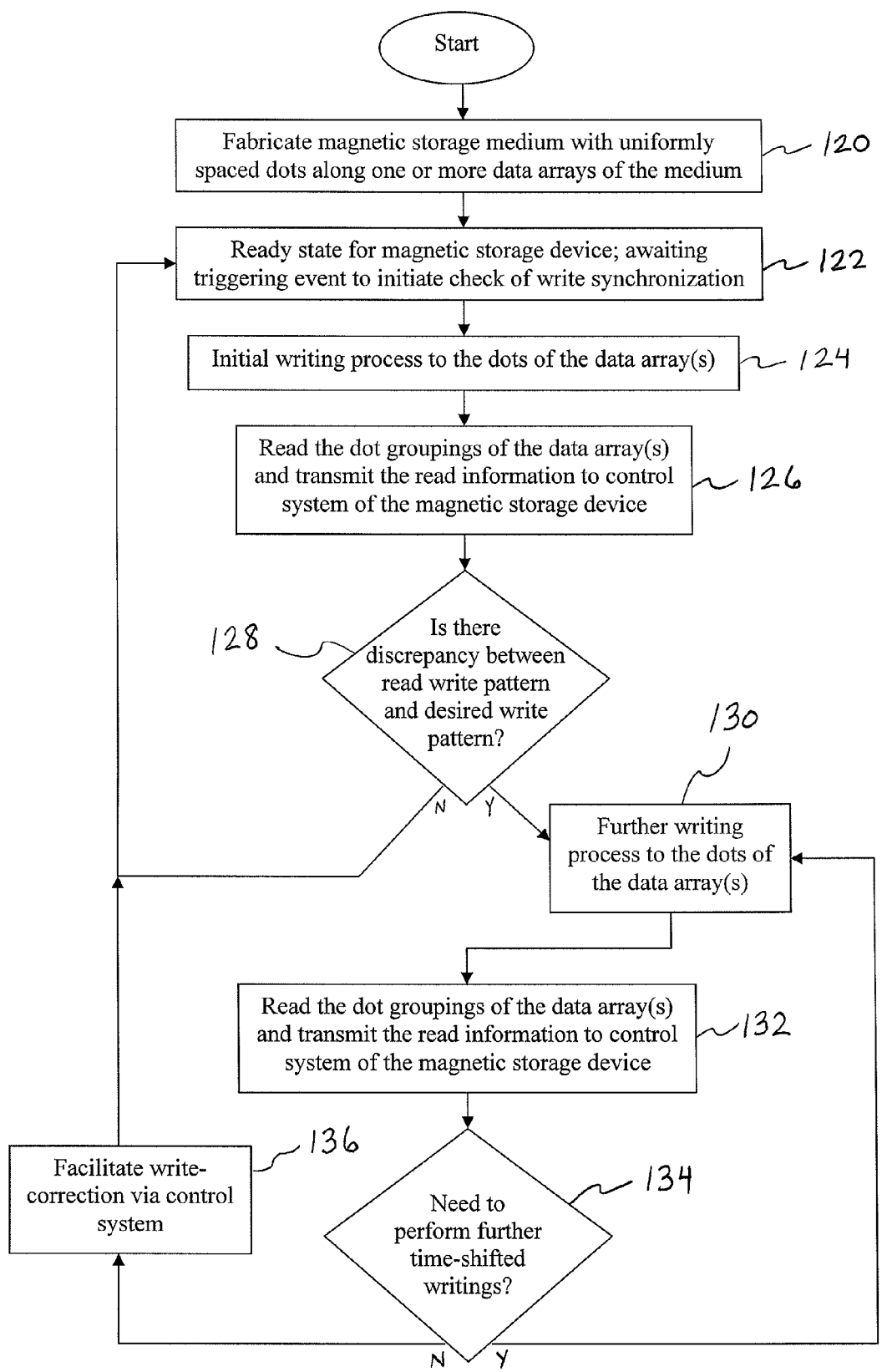
FIG. 9 is a flowchart depicting steps of the further exemplary method of correcting write synchronization corresponding to the magnetic storage medium of FIG. 7 in accordance with certain embodiments of the invention.

As described above, time-shifting techniques can be applied in a variety of manners in correcting write synchronization for magnetic storage devices. For example, in certain embodiments, such correction can involve time-shifting the write process for the dots being written to on the magnetic storage medium. To help illustrate this type of time-shifting, FIGS. 7 and 8 each show top plan views of a data array on a portion of a magnetic storage medium in accordance with certain embodiments of the invention. Similar to that described above with respect to FIGS. 4 and 5, FIG. 7 illustrates the data array prior to a write process, while FIG. 8 illustrates the array following one time-shifted write process. Further, similar to FIG. 6 described above, FIG. 9 corresponds with FIGS. 7 and 8, and is a flowchart for the time-shifting method in accordance with certain embodiments of the invention.

Referring to FIG. 7, the dots 52 of the data array 110 can be provided in one or more rows. For example, as shown, the dots 52 are exemplarily provided in two rows, a top row 112 and a bottom row 114. As illustrated, the dots 52 of each row 112 and 114 are spaced uniformly along the extent of the data array 110 by a certain distance 116, e.g., 1T. Similar to that described above with respect to the dots 52 of FIG. 4, each dot 52 of the data array 110 is magnetized, either positively (shown with a "+" designation) or negatively (shown with a "−" designation). In certain embodiments, as shown in FIG. 7, the top row 112 of the data array 110 may be positively magnetized, while the bottom row 114 of the array 110 may be negatively magnetized. However, similar to that described above with respect to FIG. 4, it should be appreciated that the magnetization pattern of the dots 52 can take any of a wide variety of forms. Further, regardless of what technique is used in recording to the dots 52 of the magnetic storage media, the embodiments provided herein are applicable.

In certain embodiments, known codes are written to the dots 52 of the data array 110 over a plurality of time-shifts with respect to the write process. Accordingly, each time-shifted write process will result in its own distinct recording of the codes with respect to the dots 52 along the array 110. As a result, depending on the magnitude of the time-shift, most of the write processes result in a write pattern being offset from the expected write pattern of the codes with respect to the dots 52 of the array 110. Accordingly, by time-shifting the write process, a comparison can be made between the resultant write patterns of the codes and the expected write pattern of the codes. In determining which time-shift yields the lowest write positioning error of the codes, i.e., the closest alignment with the expected write pattern, the magnetic storage device, in turn, can use such time-shift to correspondingly shift the write current to the write head for future write processes.

With further reference to FIG. 7, in writing to the dots 52 of the data array 110, a write head 61a will only write to a certain percentage of the dots 52, or within a certain write-timing window of the array 110. As a result, similar to that described above with respect to FIGS. 4-6, only certain dots 52 of the array 110 will be written to. For example, while embodiments of the invention should not be limited to such, if the initial recording pattern involves alternating magnetizations of a contiguous extent of dots 52, the magnetizations of the written-to dots will be reflected as one segment of the data array 110, with the dots 52 in the segment having their magnetizations reversed.

FIG. 8 depicts the data array 110 of FIG. 7 after an initial write process in accordance with certain embodiments of the invention. As described above, while the operation system knows the initial write pattern (known sequence of codes) in which to write to the dots, the timing of the first write process is generally not time-shifted. As exemplified, the write head 61a writes within write-timing window 82'. Consequently, as depicted in FIG. 5, only those dots 52 falling within the window 82' have their magnetizations reversed, i.e., magnetization directions flipped. Following the initial write process, the read head 61b reads the dots 52 of the data array 110 and transmits such read information to a control system of the magnetic storage system. In certain embodiments involving the disc drive 10 and corresponding disc 16 of FIGS. 1-3 (and similar to what is described for FIGS. 4-6), such information is transmitted via the flex circuit assembly 42 to a controller (e.g., a microprocessor) of the PCBA. The controller, in such embodiments, compares the write pattern of the dots 52 following the initial write process to an expected write pattern (e.g., stored in memory of the controller), and determines if there is any discrepancy, i.e., error, between the two. If an error is determined, such error would correspond to the initial write process and is stored in the controller memory.

Such writing process can be repeated as desired with further write processes being time-shifted from the initial write process. For example, in certain embodiments, subsequent write processes can involve the write process having a write-time shift of x % of the initial write process, then a write-time shift of 2x % of the initial write process, then a write-time shift of 3x % of the initial write process, and so on. Following further readings of the write patterns from these time-shifted write processes, write positioning errors are calculated between these write patterns and the expected write pattern, and the errors, along with their corresponding write process time shifts, are stored in the PCBA controller memory.

In turn, via a write-timing gate (not shown) of the preamplifier/driver circuit 44, the PCBA controller can direct the write current so as to provide a corresponding write synchronization correction. In certain embodiments, such correction can be based in reference to the specific time-shift of the writing process resulting in the smallest error. For example, upon shifting the write pattern by a time shift of 2x % of the initial write process and calculating the corresponding write positioning error, such time shift of 2x % may be found to result in the smallest write error when compared to the expected write pattern (as opposed to other time-shifted writings or the initial write process to the data array 110). Accordingly, the write current would be shifted −2x % to bring future writing processes in expected phase with the dots 52 of the data array 110.

As described above, FIG. 9 is a flowchart for the time-shifting method exemplarily illustrated with FIGS. 7 and 8 in accordance with certain embodiments of the invention. Step 120 involves fabricating a magnetic storage medium with dots 52 created along one or more data arrays 70. For example, in certain embodiments with reference to FIG. 2, when the medium is a magnetic recording disc 16, the dots 52 are provided along one or more of the concentric data tracks, e.g., 54, 54', etc., on the disc 16. As described above with reference to FIG. 7, the dots 52 are uniformly spaced. While FIG. 7 exemplarily depicts one data array 70 and the dots 52 thereon, in certain embodiments, any of the other data arrays on the medium can be similarly constructed as well.

Step 122 involves a ready state for the magnetic storage device, and is similar to that described with respect to step 92 in FIG. 6. Step 124 involves an initial writing to the dots 52 of the data array 110. Such step initially involves positioning the write head 61a over the data array 110, which would be similar to that described with respect to step 94 in FIG. 6. Once so positioned, the write head 61a is ready to begin writing to the dots 52. As described above, in certain embodiments, the write head 61a takes its cues from a controller of the PCBA of the disc drive 10. The PCBA works in conjunction with the flex circuit assembly 42 so as to control the timing of the write currents from the preamplifier/driver circuit 44. Accordingly, in certain embodiments, the controller of the PCBA transmits signals to the write head 61a to facilitate an initial write pattern with respect to the dot groupings 72 of the data array 70. As described above, only those dot groupings 72 falling within the write-timing window 82' are recorded to, resulting in their magnetizations being reversed. As noted above, no time-shift is required with respect to the initial write process.

Step 126 involves reading the dots 52 of the data array 110 and transmitting the read information to the magnetic storage operation system, which is similar to that described with respect to step 96 in FIG. 6. Step 128 involves determining, by the PCBA controller, whether there is a discrepancy, i.e., write positioning error, between the write pattern of the dots 52 following the initial write process and an expected write pattern (e.g., stored in memory of the controller). If an error is determined, such error would correspond to the initial write process, with such data being logged in the controller memory, with the flowchart proceeding to step 130. However, if no error is determined, the flowchart loops back to step 122.

Step 130 involves a further writing process to the dots 52 of the data array 110. Accordingly, as described above, such further writing process involves the same write pattern being prompted as initially written in step 124, but with a known time-shift of the initial write process. As described above, in certain embodiments, the known time-shift of further write processes may begin with a write-time shift of x % of the initial write process, and sequentially progress to further deviations of the initial write process, e.g., 2x %, 3x %, and so on, with such deviations, in certain embodiments, being programmed in the PCBA controller. However, such deviations can be programmed as desired, and should not limit the embodiments described herein.

Step 132 involves reading the dots 52 of the data array 70 and transmitting the read information to the magnetic storage operation system (similar to step 126 above). Step 132 further involves determining, by the PCBA controller, any discrepancy, i.e., write positioning error, between the write pattern of the dots 52 following the further write process and the expected write pattern (e.g., stored in memory of the controller). If an error is determined, such error would correspond to the further write process, with such data being logged in the controller memory.

Step 134 involves determining whether further time-shifted write processes need to be performed. In certain embodiments, such determination is provided by the PCBA controller. For example, in certain embodiments, a certain quantity of write process iterations (e.g., programmed in the PCBA controller) need to be performed prior to the system being triggered to proceed with determining time-shift write correction (step 136). Alternatively, in certain embodiments, a timer (e.g., as part of the PCBA controller) is activated after the initial write process, where after a certain period of time, the system is triggered to proceed with determining the correction. In certain embodiments, the trigger could be a combination of the above parameters or other like parameters. If it is determined that further time-shifted write processes need to be performed, the flowchart loops back to step 128; otherwise, the flowchart proceeds to step 136.

Step 136 involves correcting the write synchronization. In certain embodiments, as described above with reference to FIG. 8, such correction is based in reference to the particular time-shift of the writing process corresponding to the smallest write positioning error, and is facilitated via the PCBA controller. After such correction, the flowchart loops back to step 122.

Although the present invention has been described with reference to certain disclosed embodiments, those skilled in the art will recognize that changes may be made in form and detail without departing from the spirit and scope of the invention.

What is claimed is:

1. A method comprising:
    writing a known sequence of codes to one data array of a magnetic storage medium in the magnetic storage device, the one data array having a plurality of dots located thereon, the dots provided in a plurality of groupings with the groupings extending along the one data array, wherein spacing of the dots of each dot grouping is different from spacing of the dot groupings;
    reading the one data array after the known sequence of codes has been written thereto;
    determining whether write synchronization of the magnetic storage device needs to be corrected based on the read information; and
    correcting write synchronization of the magnetic storage device with respect to the one data array if determination indicates such correction is needed, whereby such correction comprises shifting a write-timing window forward or back along the one data array by at least one dot grouping.

2. The method of claim 1 wherein the magnetic storage device comprises a disc drive and the magnetic storage medium comprises a magnetic storage disc, wherein writing to the one data array comprises writing to a data track of the magnetic storage disc.

3. The method of claim 1 wherein writing the known sequence of codes to the one data array comprises reversing magnetization direction of one or more of the dot groupings along the one data array based on the known sequence of codes, wherein reading the one data array comprises reading the reversed magnetization directions of the one or more dot groupings.

4. The method of claim 1 wherein determining whether write synchronization needs to be corrected comprises comparing a read magnetization pattern of the one data array to an expected magnetization pattern for the one data array, wherein the read magnetization pattern of the one data array corresponds to the known sequence of codes as read from the one data array.

5. The method of claim 4 wherein comparing the read magnetization pattern to the expected magnetization pattern is performed by a controller of the magnetic storage device, wherein the controller has memory in which the expected magnetization pattern is stored.

6. The method of claim 4 wherein a difference between the read magnetization pattern and the expected magnetization pattern corresponds to the shift of the write-timing window in correcting the write synchronization of the magnetic storage device.

* * * * *